United States Patent [19]
Turtiainen et al.

[11] Patent Number: 5,954,430
[45] Date of Patent: Sep. 21, 1999

[54] METHOD AND TEMPERATURE SENSOR STRUCTURE FOR ELIMINATION OF RADIATION ERROR

[75] Inventors: Heikki Turtiainen; Veijo Antikainen, both of Vantaa, Finland

[73] Assignee: Vaisala Oy, Helsinki, Finland

[21] Appl. No.: 08/778,623

[22] Filed: Jan. 3, 1997

[30] Foreign Application Priority Data

Jan. 5, 1996 [FI] Finland ................................ 960067

[51] Int. Cl.$^6$ .................................................. G01J 5/58
[52] U.S. Cl. ...................................... 374/136; 374/126
[58] Field of Search .................................. 374/109, 121, 374/126, 133, 134, 136, 163, 166, 208

[56] References Cited

U.S. PATENT DOCUMENTS

| | | | |
|---|---|---|---|
| 3,453,432 | 7/1969 | McHenry | 374/133 |
| 4,143,335 | 3/1979 | Beukers et al. | 374/142 |
| 4,881,823 | 11/1989 | Tanaka et al. | 374/126 |
| 5,483,414 | 1/1996 | Turtiainen | 374/163 |
| 5,743,642 | 4/1998 | Fons | 374/136 |

*Primary Examiner*—G. Bradley Bennett
*Attorney, Agent, or Firm*—Birch, Stewart, Kolasch & Birch, LLP

[57] ABSTRACT

The invention relates to a method and temperature sensor structure for compensating radiation error particularly in a radiosonde, rocket sonde or dropsonde. According to the method, each sonde carries at least one temperature sensor. According to the invention, the temperature measurement is carried out by means of two temperature sensors, both having low emissivities but different absorption coefficients for solar radiation.

16 Claims, 2 Drawing Sheets

METHOD AND TEMPERATURE SENSOR STRUCTURE FOR ELIMINATION OF RADIATION ERROR

BACKGROUND OF THE INVENTION

The invention relates to a method according to the preamble of claim 1 for elimination of radiation error in atmospheric temperature measurements.

The invention also concerns a temperature sensor structure.

One of the major sources of error in the temperature measurement of the upper atmosphere (by means of, e.g., radiosondes, rocket sondes and dropsondes) is the so-called radiation error of the temperature sensor. This type of error is caused by the drop of air density at higher altitudes, whereby convection heat transfer between the temperature sensor and air becomes weaker, while the relative proportion of radiation heat transfer simultaneously increases. Resultingly, the sensor temperature usually deviates from that of the ambient air, whereby it may be higher or lower depending on the local radiation circumstances in the atmosphere.

Heat transfer between the sensor and the atmosphere is described by equation:

$$H(T_s - T) - \sigma \epsilon A T_s^4 + \epsilon R + \gamma S = 0 \quad (1),$$

where $T_s$ = sensor temperature (K)

T = air temperature (K)

H = convection heat transfer coefficient (W/K)

$\sigma$ = Stefan-Bolzmann constant $\epsilon$ = sensor surface emissivity

A = sensor area (m$^2$)

R = radiant power (W) of long-wavelength (thermal) radiation incident on the sensor $\gamma$ = sensor surface absorption coefficient for short-wavelength (solar) radiation S = solar radiation power (W) incident on the sensor.

The first term $-H(T_s-T)$ of the equation represents convection heat transfer. The last three terms represent radiation heat transfer. The term $-\sigma \epsilon A T_s^4$ represents the thermal emission loss component of the sensor, while the term $\epsilon R$ represents the component of thermal radiation (that is, long-wavelength radiation, $\lambda \approx 3-40$ $\mu$m) absorbed by the sensor. The term $\gamma S$ represents the component of solar radiation (that is, short-wavelength radiation, $\lambda \approx 0.2-3$ $\mu$m) absorbed by the sensor. The component of convection heat transfer has been assumed negligible.

Radiation error can be reduced by making the dimensions of the sensor the smallest possible, whereby the ratio of convection heat transfer to radiation heat transfer is accentuated. Another approach is to coat the sensor with a coating system of the smallest possible absorption coefficient. Both of these methods are used in conventional sensor embodiments. However, the radiation error cannot be entirely eliminated by these means, because the dimensions and absorption coefficient of the sensor cannot be made indefinitely small.

A method of radiation error elimination different from those described above is based on using three sensors of identical structure and dimension but coated with different coating systems. Each of the coating systems has a different emissivity and coefficient of absorption for solar radiation. Correspondingly, the parallel sensors have different radiation errors and indicate different temperatures, whose values are dependent on the radiation circumstances of the atmosphere. Then, a separate heat transfer equation (1) can be written for each sensor, whereby a set of three equations results with four unknown variables: T, R, S and H. Of these, however, the convection heat transfer coefficient H can be solved with relatively good accuracy if the shape and dimensions of the sensor are known. The rest of the unknown variables, the actual temperature T of the atmosphere inclusive, can be solved from the set of equations.

SUMMARY OF THE INVENTION

It is an object of the present invention to overcome the drawbacks of the above-described techniques and to provide an entirely novel type of method and sensor structure for elimination of the radiation error.

The goal of the invention is achieved by using only two sensors with their coating system based on materials of extremely low emissivity and different absorption coefficients for solar radiation.

The invention offers significant benefits.

With regard to the above-mentioned three-sensor arrangement, the present invention provides a number of advantages:

1) Only the ratio of solar radiation absorption coefficients of the coating systems used need be known. This value is essentially easier to measure than the absolute values of absorption coefficients and emissivities of three different coating systems. Furthermore, the ratio of absorption coefficients can be measured from ready-made, ready-coated sensors, while the absolute values of absorption coefficients and emissivities can be measured from planar samples only. Accordingly, the present method provides a much more accurate result.

2) The equipment for absorption coefficient ratio measurement is relatively simple and quick to use, whereby the ratio measurement can be made for each manufactured sensor pair as a step of the production process. This facility adds further to the accuracy of the sensor pair.

3) The thermal heat transfer coefficient H is not needed in computation, because it will be eliminated from the equation pair. Accordingly, any possible inaccuracy related to the value of this variable will not affect the end result.

4) The number of sensors required in the sensor system is reduced by one.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention will be examined in greater detail with the help of an exemplifying embodiment illustrated in the annexed drawing, in which.

DESCRIPTION OF THE PREFERRED EMBODIMENTS

According to a first embodiment of the invention, the correction of the radiation error can be accomplished using two sensors only. Herein, the sensors are coated with very-low-emissivity materials such as many of the metals, for example. Then, the long-wavelength radiation components of the equation (that is, the term of cooling due to sensor thermal radiation loss, $-\sigma\epsilon AT_s^4$, and the term of heating caused by long-wavelength radiation absorbed in the sensor, $\epsilon R$) of Eq. (1) become very small, and therefore, Eq. (1) can be simplified into an approximating form:

$$-H(T_s-T)+gS=0 \quad (2)$$

When the sensors are now coated with two different metals, each possessing low emissivity but different absorption coefficients for solar radiation, the following equation pair is obtained:

$$-H(T_1-T)+\gamma_1 S=0$$
$$-H(T_2-T)+\gamma_2 S=0 \quad (3)$$

The equation pair can be solved for the actual air temperature T:

$$T=(kT_2-T_1)/(k-1) \quad (4)$$

where k is the absorption coefficient ratio $\gamma_1/\gamma_2$.

The method will perform only with the valid assumption of negligible thermal radiation. In practice this means that the method will lose its validity under conditions of too low a wind speed or air pressure. Field tests have proven the usability of the method at least in all types of radiosonde soundings (under a wind speed greater than 3 m/s and ambient pressure greater than 3 hPa) when using a miniature sensor (dia. not greater than 1 mm).

The coatings of the sensor units are advantageously made as metallizations using two metals with different absorption coefficients. Moreover, the metals used must be corrosion-resistant so that their surface will not oxidize in the air and their absorption properties will stay constant. Suitable metals are, e.g., Al ($\gamma=10\%$), Ag ($\gamma=10\%$), Au ($\gamma=35\%$) and Ti ($\gamma=70\%$) and proper combinations thereof, such as Al—Au, Al—Ti, Ag—Au and Ag—Ti. Metallization can be made by means of vacuum evaporation, sputtering, the CVD technique, electrolytic deposition, chemical deposition or other suitable method.

Figure 1:
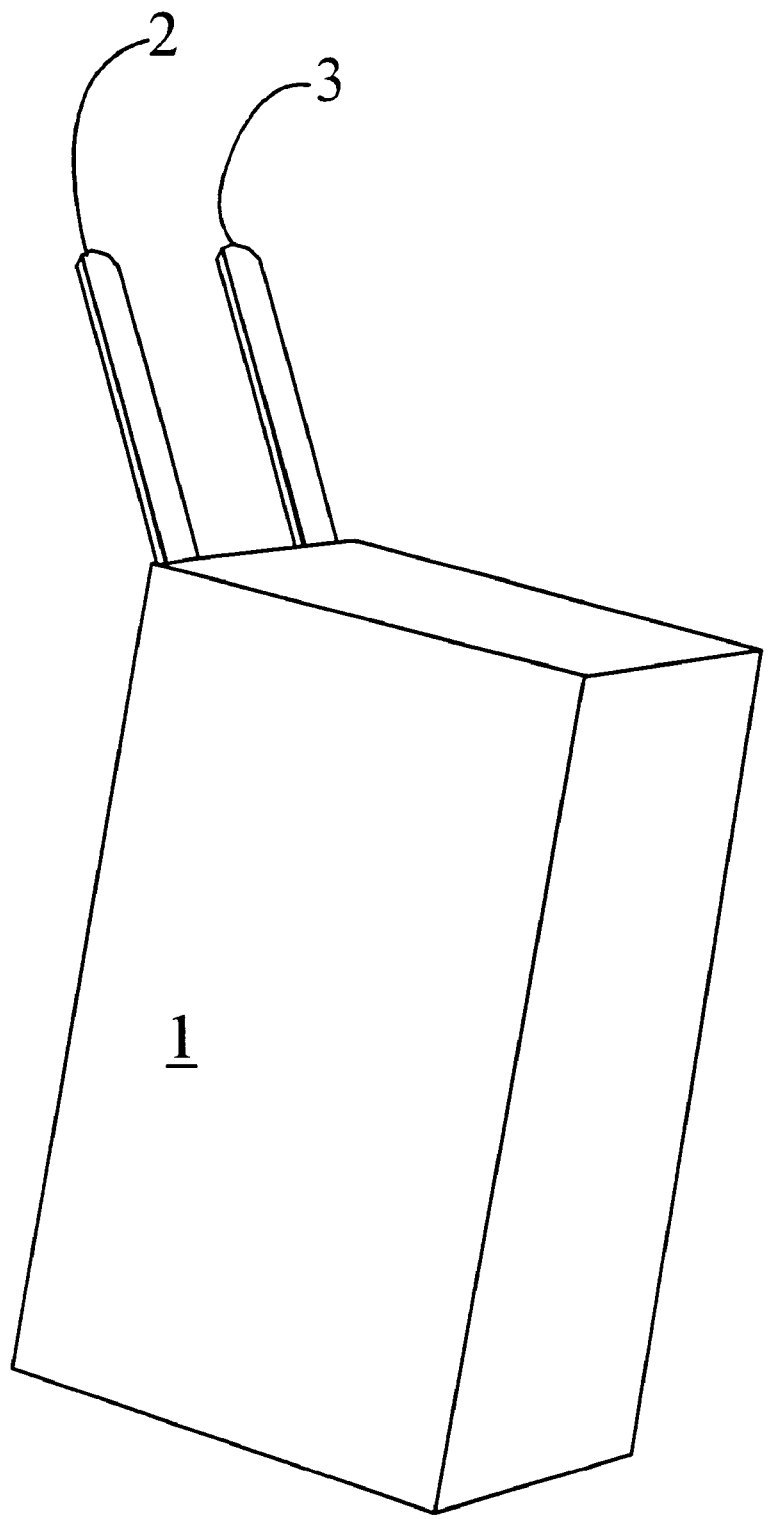
FIG. 1 shows an apparatus according to the invention in a perspective view.
Figure 2:
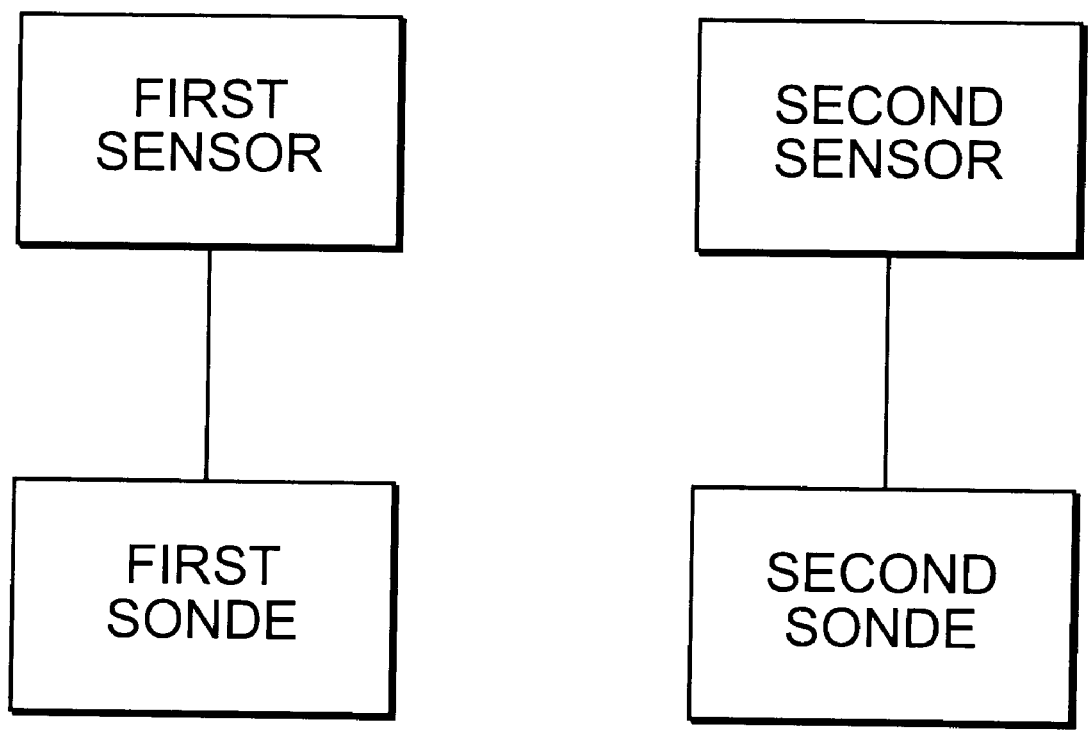
FIG. 2 shows a second embodiment having sensors on separate sondes.

When a radiosonde, rocket sonde or dropsonde is used for atmospheric temperature measurement, sounding can be carried out using either two separate sondes having their temperature sensors coated with different coating systems as illustrated in FIG. 2 or a single sonde carrying two temperature sensors coated with different coating systems systems as illustrated in FIG. 1. The former method has been used in research purposes for determination of the temperature sensor radiation error, while the latter is better suited for mass-produced sondes.

Referring to FIG. 1, a radiosonde equipped with two temperature sensors is shown therein. Mechanically connected thereto, the sonde 1 carries two sensors 2 and 3, both of the sensors 2 and 3 having low surface emissivities but different absorption coefficients for solar radiation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of compensating radiation error in atmospheric temperature measurements comprising:

using a radiosonode, rocket sonde or dropsonde equipped with at least one temperature sensor measuring temperature essentially simultaneously by means of first and second temperature sensors said sensors each coated to have low surface emissivities but different absorption coefficients for solar radiation; and compensating for radiation error by calculating heat transfer between the sensors and the atmosphere with the temperature measurements from the sensors.

2. A method as defined in claim 1, further including the step of carrying said temperature sensors by a single sonde.

3. A method as defined in claim 1, further including the step of carrying said temperature sensors by separate sondes launched essentially simultaneously.

4. A method as defined in claim 1, further comprising the step of coating said sensors with a metal.

5. A method as defined in claim 1, further comprising the step of coating said sensors with different metals, the first sensor with aluminium, and the second sensor with silver.

6. A method as defined in claim 1, further comprising the step of coating said sensors with different metals, the first sensor with aluminum and the second sensor with titanium.

7. A method as defined in claim 1, further comprising the step of coating said sensors with different metals, the first sensor with gold, and the second sensor with silver.

8. A method as defined in claim 1, further comprising the step of coating said sensors with different metals, the first sensor with silver, and the second sensor with titanium.

9. A temperature sensor structure comprising:

at least one sonde; and first and second temperature sensors carried by said at least one sonde, said sensors each coated to have low surface emissivities but different absorption coefficients for solar radiation.

10. A temperature sensor structure as defined in claim 9, wherein said temperature sensors are carried by a single sonde.

11. A temperature sensor structure as defined in claim 9, wherein said temperature sensors are carried by a separate sondes launched essentially simultaneously.

12. A temperature sensor structure as defined in claim 9, wherein said sensors are coated with a metal.

13. A temperature sensor structure as defined in claim 9, wherein said sensors are coated with different metals, the first sensor is coated with aluminum, and the second sensor is coated with silver.

14. A temperature sensor structure as defined in claim 9, wherein said sensors are coated with different metals, the first sensor is coated with aluminum, and the second sensor is coated with titanium.

15. A temperature sensor structure as defined in claim 9, wherein said sensors are coated with different metals, the first sensor is coated with gold, and the second sensor is coated with silver.

16. A temperature sensor structure as defined in claim 9, wherein said sensors are coated with different metals, the first sensor is coated with silver, and the second sensor is coated with titanium.

* * * * *